US012785537B2

(12) United States Patent
Tsai

(10) Patent No.: US 12,785,537 B2
(45) Date of Patent: Nov. 3, 2026

(54) POWER CONVERTER OF LIMITING NEGATIVE CURRENT

(71) Applicant: ANPEC ELECTRONICS CORPORATION, Hsinchu (TW)

(72) Inventor: Ming-Liang Tsai, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 129 days.

(21) Appl. No.: 18/943,828

(22) Filed: Nov. 11, 2024

(65) Prior Publication Data

US 2026/0025054 A1 Jan. 22, 2026

(30) Foreign Application Priority Data

Jul. 22, 2024 (TW) ................................ 113127250

(51) Int. Cl.
*H02M 3/158* (2006.01)
*H02M 1/00* (2007.01)

(52) U.S. Cl.
CPC ....... *H02M 1/0025* (2021.05); *H02M 1/0009* (2021.05); *H02M 1/0012* (2021.05); *H02M 1/0058* (2021.05)

(58) Field of Classification Search
CPC ............. H02M 1/0025; H02M 1/0009; H02M 1/0032; H02M 1/0058; H02M 3/158
See application file for complete search history.

(56) References Cited

U.S. PATENT DOCUMENTS

2021/0184559 A1* 6/2021 Tsai ...................... H02M 3/158
2021/0242780 A1* 8/2021 Pahkala ................... H03K 7/08
2021/0305899 A1* 9/2021 Hsieh .................. H02M 1/0035
2022/0376599 A1* 11/2022 Lin ..................... H02M 1/0009
2024/0178755 A1* 5/2024 Scandola ............ H02M 1/0058
2024/0195287 A1* 6/2024 Chen ....................... H02M 1/32
2025/0149983 A1* 5/2025 Scaduto .................. H02M 3/01
2025/0253754 A1* 8/2025 Kung .................. H02M 1/0009

* cited by examiner

*Primary Examiner* — Sisay G Tiku
(74) *Attorney, Agent, or Firm* — Li & Cai Intellectual Property Office

(57) ABSTRACT

A power converter of limiting a negative current is provided. The power converter includes a high-side switch, a low-side switch, a low-side detecting circuit, a control circuit and a driver circuit. The low-side detecting circuit detects a negative current flowing through the low-side switch or an on-time of the low-side switch to output a low-side detected signal. The control circuit outputs a control signal according to the low-side detected signal. The driver circuit, according to the control signal, outputs a high-side on-time signal to a control terminal of the high-side switch and outputs a low-side on-time signal to a control terminal of the low-side switch.

11 Claims, 9 Drawing Sheets

POWER CONVERTER OF LIMITING NEGATIVE CURRENT

CROSS-REFERENCE TO RELATED PATENT APPLICATION

This application claims the benefit of priority to Taiwan Patent Application No. 113127250, filed on Jul. 22, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is “prior art” to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter of limiting a negative current.

BACKGROUND OF THE DISCLOSURE

Power converters are indispensable for electronic devices. The power converters are used to adjust power and supply the adjusted power to the electronic devices. When a load transits from a heavy load or a medium load to a (super) light load such that power required for the load is reduced or an input voltage coupled with a high-side switch of a conventional power converter is abnormally increased to an excessive voltage value, a driver circuit turns off the high-side switch and turns on a low-side switch in the conventional power converter. At this time, a negative current flows from an output inductor though the low-side switch of the conventional power converter to a ground. As a result, the power that is supplied from the conventional power converter to the load is reduced.

However, the driver circuit of the conventional power converter is unable to effectively limit an on-time of the low-side switch, which can lead to the negative current being increased to an excessive current value and causing damage to the low-side switch of the conventional power converter.

SUMMARY OF THE DISCLOSURE

In response to the above-referenced technical inadequacies, the present disclosure provides a power converter of limiting a negative current. The power converter includes a high-side switch, a low-side switch, a low-side detecting circuit, a control circuit and a driver circuit. A first terminal of the high-side switch is coupled with an input voltage. A first terminal of the low-side switch is connected to a second terminal of the low-side switch. A second terminal of the low-side switch is grounded. A first node between the first terminal of the low-side switch and the second terminal of the low-side switch is connected to a first terminal of an output inductor. A second terminal of the output inductor is connected to a first terminal of an output capacitor. A second terminal of the output capacitor is grounded. The low-side detecting circuit is configured to detect a voltage of a second node between the second terminal of the low-side switch and the first terminal of the output inductor, a current flowing through the second node or a low-side on-time signal to output a low-side detected signal. The control circuit is connected to the low-side detecting circuit. The control circuit is configured to output a control signal according to the low-side detected signal. The driver circuit is connected to the control circuit, a control terminal of the high-side switch and a control terminal of the low-side switch. The driver circuit is configured to output a high-side on-time signal to the control terminal of the high-side switch and output the low-side on-time signal to the control terminal of the low-side switch according to the control signal.

As described above, the present disclosure provides the power converter of limiting the negative current. When the load transits from a heavy load or a medium load to the (super) light load or the input voltage is abnormally increased, the high-side switch is turned off and the low-side switch is turned on in the power converter of the present disclosure. At the same time, in the power converter of the present disclosure, the low-side detecting circuit detects the negative current flowing through the low-side switch or the low-side on-time signal of the low-side switch. The on-time of the low-side switch is limited according to the detected negative current or the detected low-side on-time signal such that the negative current flowing through the low-side switch is limited to being within a safe operation range that the low-side switch and other circuit components of the power converter are capable of withstanding. Therefore, the negative current flowing through the low-side switch of the power converter of the present disclosure is effectively prevented from being increased to an excessive value to cause damage in the low-side switch of the power converter of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
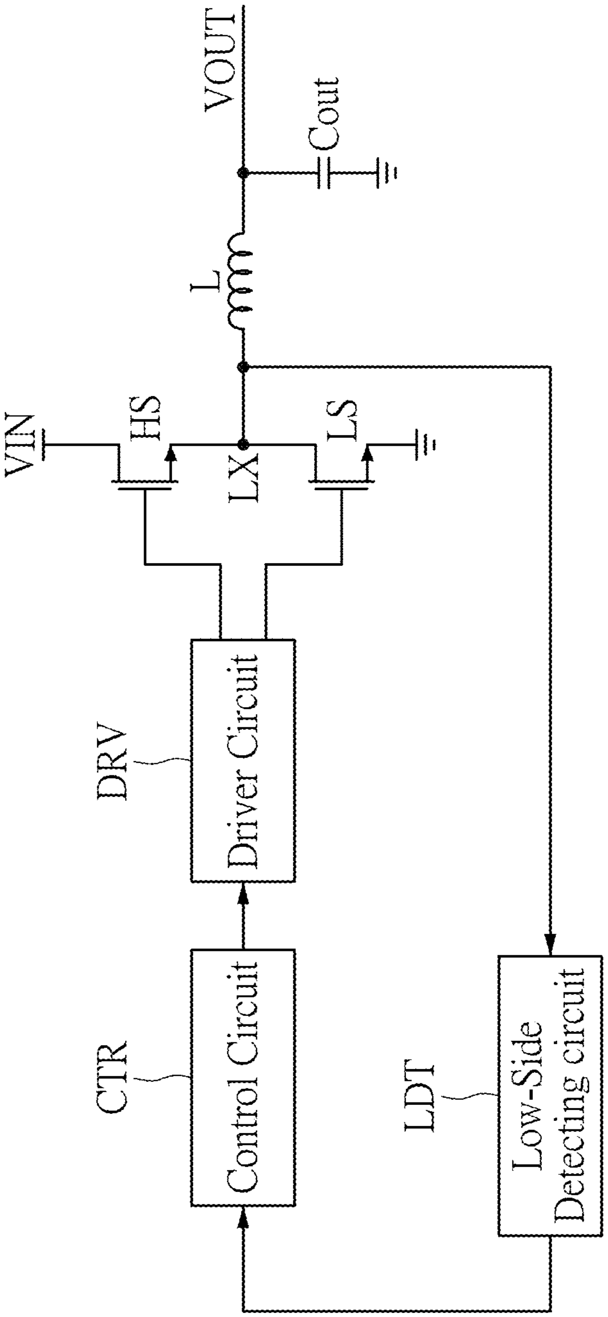
FIG. 1 is a circuit diagram of a power converter according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a power converter according to a first embodiment of the present disclosure.

As shown in FIG. 1, in the first embodiment, the power converter of the present disclosure includes a high-side switch HS, a low-side switch LS, a control circuit CTR and a driver circuit DRV.

It is worth noting that, the power converter of the present disclosure further includes a low-side detecting circuit LDT for effectively limiting a negative current flowing through the low-side switch LS of the power converter of the present disclosure. In particular, when a load connected to an output terminal of the power converter of the present disclosure is a super light load, an on-time of the low-side switch LS is limited so as to limit the negative current flowing through the low-side switch LS. Therefore, the low-side switch LS and other circuit components of the present disclosure are prevented from being damaged by an excessive negative current.

A first terminal of the high-side switch HS is coupled with an input voltage VIN. A first terminal of the low-side switch LS is connected to a second terminal of the high-side switch HS. A second terminal of the low-side switch LS is grounded.

A first node LX between the first terminal of the low-side switch LS and the second terminal of the high-side switch HS is connected to a first terminal of an output inductor L. A second terminal of the output inductor L is connected to a first terminal of an output capacitor Cout. A second terminal of the output capacitor Cout is grounded.

An output node between the second terminal of the output inductor L and the first terminal of the output capacitor Cout is used as the output terminal of the power converter of the present disclosure. A voltage of the output node between the second terminal of the output inductor L and the first terminal of the output capacitor Cout is used as an output voltage VOUT of the output terminal of the power converter of the present disclosure.

The low-side detecting circuit LDT is connected to or contacts a second node between the first terminal of the low-side switch LS and the first terminal of the output inductor L.

The control circuit CTR is connected to the low-side detecting circuit LDT. The driver circuit DRV is connected to the control circuit CTR, a control terminal of the high-side switch HS, and a control terminal of the low-side switch LS.

The low-side detecting circuit LDT detects a parameter of the second node between the first terminal of the low-side switch LS and the first terminal of the output inductor L to output a low-side detected signal. The parameter includes a voltage, a current or a combination thereof.

It is worth noting that, when the control circuit CTR turns on the low-side switch LS and turns off the high-side switch HS, the low-side detecting circuit LDT detects a current flowing from the output inductor L through the second node between the first terminal of the low-side switch LS and the first terminal of the output inductor L to the low-side switch LS as a detected current to output the low-side detected signal. The detected current is a negative current. A flowing direction of the detected current is opposite to a flowing direction of a positive current that flows from the high-side switch HS to the output inductor L. The positive current is generated when the low-side switch LS is turned off and the high-side switch HS is turned on.

The control circuit CTR outputs a control signal according to the low-side detected signal from the low-side detecting circuit LDT.

The driver circuit DRV, according to the control signal from the control circuit CTR, determines an on-time of the high-side switch HS and the on-time of the low-side switch LS to output a high-side on-time signal to the control terminal of the high-side switch HS and output a low-side on-time signal to the control terminal of the low-side switch LS.

Working periods of a plurality of waveforms of the high-side on-time signal (that are respectively aligned with non-working periods of a plurality of waveforms of the low-side on-time signal) are on-times of the high-side switch HS. That is, the high-side switch HS is turned on within the working periods of the plurality of waveforms of the high-side on-time signal. Non-working periods of the plurality of waveforms of the high-side on-time signal (that are respectively aligned with working periods of the plurality of waveforms of the low-side on-time signal) are off-times of the high-side switch HS. That is, the high-side switch HS is turned off within the non-working periods of the plurality of waveforms of the high-side on-time signal.

Working periods of the plurality of waveforms of the low-side on-time signal (that are respectively aligned with the non-working periods of the plurality waveforms of the high-side on-time signal) are on-times of the low-side switch LS. That is, the low-side switch LS is turned on within the working periods of the plurality of waveforms of the low-side on-time signal. Non-working periods of the plurality of waveforms of the low-side on-time signal (that are respectively aligned with the working periods of the plurality waveforms of the high-side on-time signal) are on-times of the low-side switch LS. That is, the low-side switch LS is turned off within the non-working periods of the plurality of waveforms of the low-side on-time signal.

In comparison with a conventional power converter, the power converter of the present disclosure further includes the low-side detecting circuit LDT. Therefore, in the power converter of the present disclosure, the on-time of the low-side switch LS is more appropriately controlled or adjusted according to the detected negative current that flows from the output inductor L to the low-side switch LS within the on-time of the low-side switch LS. The negative current that flows from the output inductor L to the low-side switch LS is prevented from being increased to an excessive value to cause damage to the low-side switch LS and other circuit components in the power converter.

In particular, when the load connected to the output terminal of the power converter of the present disclosure is the super light load, less power is required for the super light load. In order to reduce a current supplied to the super light load by the power converter, the on-time of the high-side switch HS is reduced and the on-time of the low-side switch LS is increased. At the same time, the on-time of the low-side switch LS is appropriately limited to prevent the negative current flowing through the low-side switch LS from being increased to the excessive value to cause damage to the low-side switch LS.

Figure 2:
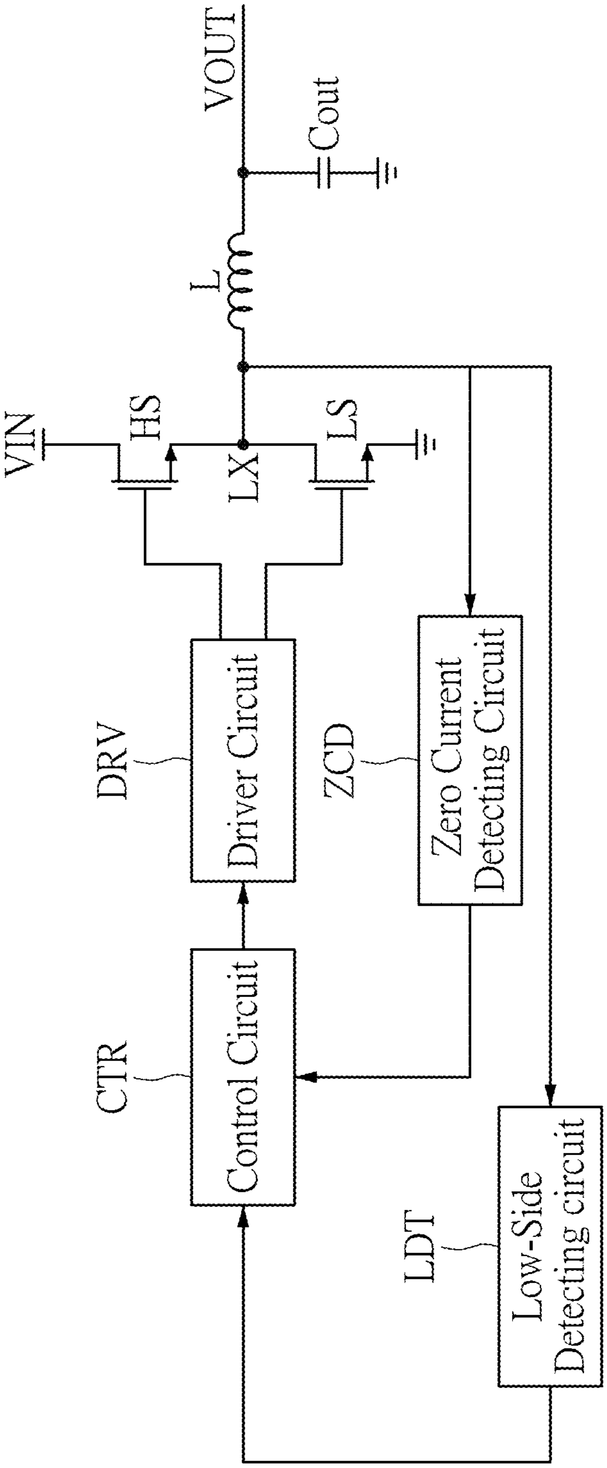
FIG. 2 is a circuit diagram of a power converter according to a second embodiment of the present disclosure.

Reference is made to FIG. 2, which is a circuit diagram of a power converter according to a second embodiment of the present disclosure.

The descriptions of the second embodiment of the present disclosure that are the same as the descriptions of the first embodiment of the present disclosure are not repeated herein.

A difference between the second and first embodiments of the present disclosure is that, the power converter of the second embodiment of the present disclosure further includes a zero current detecting circuit ZCD.

The zero current detecting circuit ZCD is connected to the first node LX between the first terminal of the low-side switch LS and the second terminal of the high-side switch HS, and is connected to the control circuit CTR.

The zero current detecting circuit ZCD may detect a current signal flowing through the first node LX between the first terminal of the low-side switch LS and the second terminal of the high-side switch HS, and may determine whether the current signal reaches a zero value to output a zero current detected signal.

The control circuit CTR, according to the zero current detected signal from the zero current detecting circuit ZCD, modulates the control signal and outputs the control signal that is modulated to the driver circuit DRV. In particular, the on-time of the low-side switch LS is limited to prevent the negative current flowing through the low-side switch LS from being increased to the excessive value to cause damage to the low-side switch LS.

Figure 3:
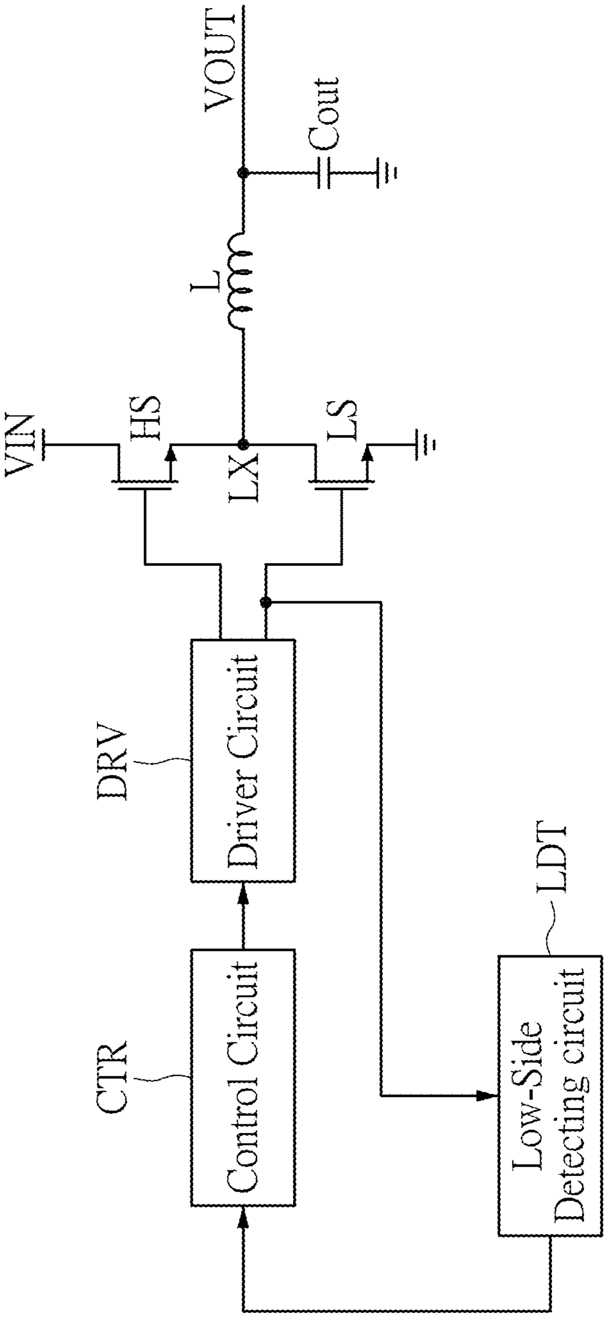
FIG. 3 is a circuit diagram of a power converter according to a third embodiment of the present disclosure.

Reference is made to FIG. 3, which is a circuit diagram of a power converter according to a third embodiment of the present disclosure.

As shown in FIG. 3, in the third embodiment, the power converter of the present disclosure includes the high-side switch HS, the low-side switch LS, the control circuit CTR and the driver circuit DRV that are the same as that of the first embodiment. The descriptions of the third embodiment of the present disclosure that are the same as the descriptions of the first embodiment of the present disclosure are not repeated herein.

It is worth noting that, the power converter of the third embodiment of the present disclosure further includes the low-side detecting circuit LDT. A configuration of the low-side detecting circuit LDT of the third embodiment of the present disclosure is different from that of the first embodiment of the present disclosure.

As shown in FIG. 3, in the third embodiment, the low-side detecting circuit LDT is connected to a node between an output terminal of the driver circuit DRV and the control terminal of the low-side switch LS.

The low-side detecting circuit LDT may detect the low-side on-time signal that is outputted from the driver circuit DRV to the control terminal of the low-side switch LS to output the low-side detected signal.

The control circuit CTR, according to the low-side detected signal from the low-side detecting circuit LDT, determines the on-time of the low-side switch LS and modulates the control signal outputted to the driver circuit DRV for limiting the on-time of the low-side switch LS. In particular, when the load connected to the output terminal of the power converter of the present disclosure is the super light load that only requires very little power such that the low-side switch LS is turned on, the control circuit CTR of the power converter of the present disclosure limits the on-time of the low-side switch LS to be smaller than an on-time threshold. Therefore, the negative current that flows from the output inductor L to the low-side switch LS is prevented from being increased to the excessive value to cause damage to the low-side switch LS.

Figure 4:
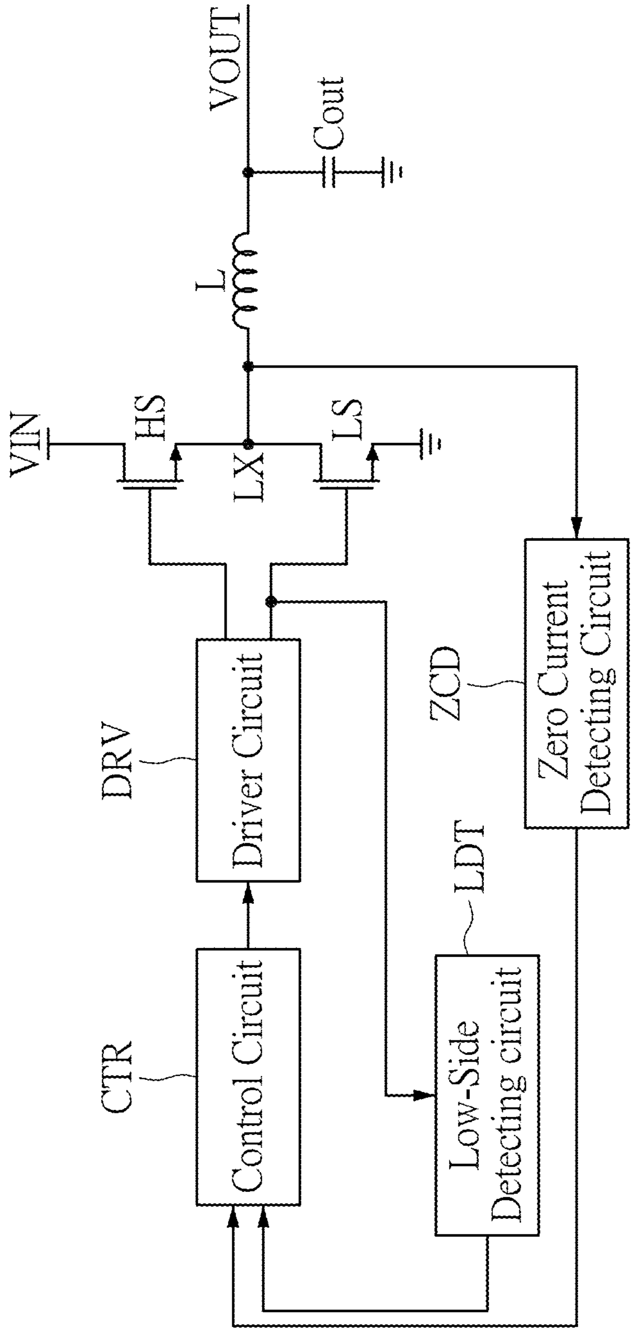
FIG. 4 is a circuit diagram of a power converter according to a fourth embodiment of the present disclosure.

Reference is made to FIG. 4, which is a circuit diagram of a power converter according to a fourth embodiment of the present disclosure.

A difference between the power converter shown in FIG. 4 and the power converter shown in FIG. 3 is that, the power converter shown in FIG. 4 not only includes the low-side detecting circuit LDT, but also includes the zero current detecting circuit ZCD for more accurately controlling the on-time of the low-side switch LS.

The configuration and operation of the zero current detecting circuit ZCD shown in FIG. 4 are the same as those of the zero current detecting circuit ZCD shown in FIG. 2, and thus are not repeated herein.

Figure 5:
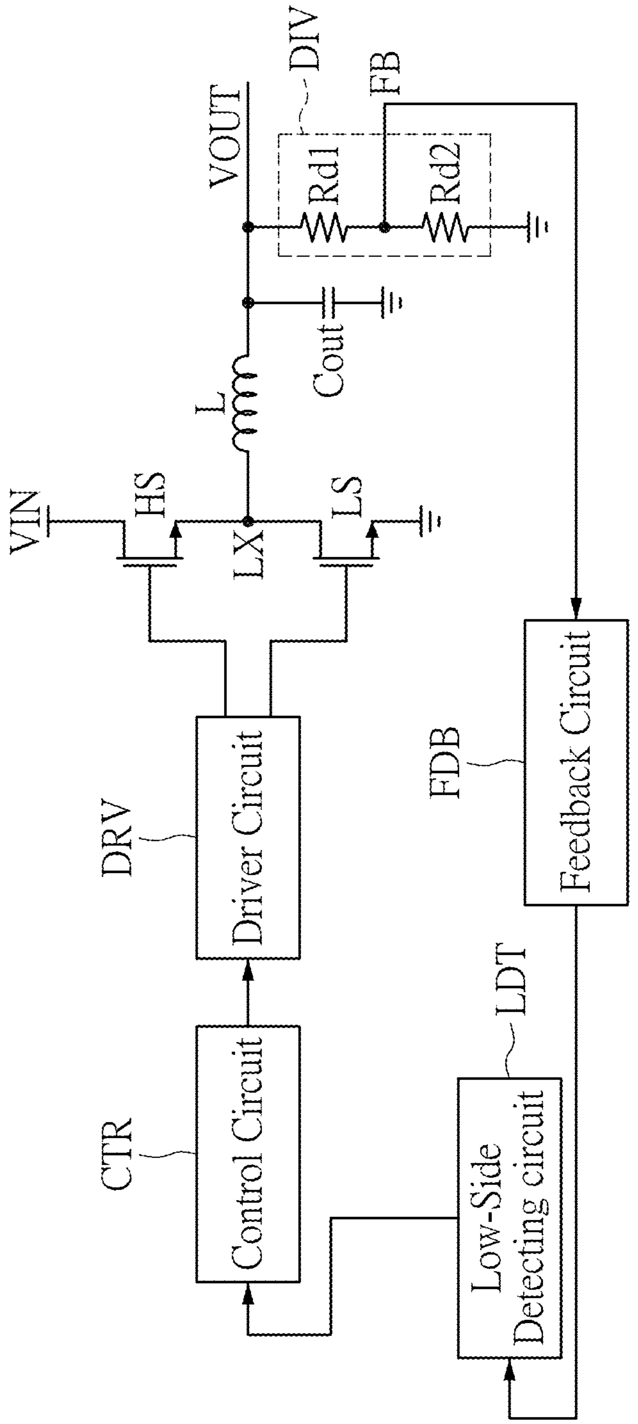
FIG. 5 is a circuit diagram of a power converter according to a fifth embodiment of the present disclosure.

Reference is made to FIG. 5, which is a circuit diagram of a power converter according to a fifth embodiment of the present disclosure.

As shown in FIG. 3, in the fifth embodiment, the power converter of the present disclosure includes the high-side switch HS, the low-side switch LS, the control circuit CTR and the driver circuit DRV that are the same as those of the first embodiment, and thus are not repeated herein.

It is worth noting that, the power converter of the fifth embodiment of the present disclosure further includes the low-side detecting circuit LDT and a feedback circuit FDB. A configuration of the low-side detecting circuit LDT of the power converter of the fifth embodiment of the present disclosure is different from that of the first and third embodiments of the present disclosure.

If necessary, the power converter of the present disclosure may further include a voltage divider circuit DIV shown in FIG. 5. For example, the voltage divider circuit DIV may include a first dividing resistor Rd1 and a second dividing resistor Rd2.

The output node between the second terminal of the output inductor L and the first terminal of the output capacitor Cout is used as the output terminal of the power converter of the present disclosure, and is connected to a first terminal of the first dividing resistor Rd1. A first terminal of the second dividing resistor Rd2 is connected to a second terminal of the first dividing resistor Rd1. A second terminal of the second dividing resistor Rd2 is grounded.

A voltage of the first terminal of the second dividing resistor Rd2 is a divided volage FB of the output voltage VOUT of the output terminal of the power converter of the present disclosure.

The feedback circuit FDB may be connected to a feedback node between the first terminal of the second dividing resistor Rd2 and the second terminal of the first dividing resistor Rd1 as shown in FIG. 5, or may be directly connected to the output node between the second terminal of the output inductor L and the first terminal of the output capacitor Cout in practice.

The feedback circuit FDB outputs a feedback signal according to the divided volage FB (that is divided from the output voltage VOUT of the output terminal of the power converter of the present disclosure) as shown in FIG. 5. In practice, the feedback circuit FDB may output the feedback signal according to the output voltage VOUT of the output node between the second terminal of the output inductor L and the first terminal of the output capacitor Cout.

The low-side detecting circuit LDT detects the feedback signal outputted by the feedback circuit FDB, and determines the on-time of the low-side switch LS to output the low-side detected signal according to the detected feedback signal.

The control circuit CTR determines the on-time of the low-side switch LS to output the control signal according to the low-side detected signal from the low-side detecting circuit LDT.

The driver circuit DRV, according to the control signal from the control circuit CTR, outputs the high-side on-time signal to the control terminal of the high-side switch HS and outputs the low-side on-time signal to the control terminal of the low-side switch LS.

In comparison with the conventional power converter, the power converter of the fifth embodiment of the present disclosure further includes the low-side detecting circuit LDT. Therefore, in the power converter of the present disclosure, the on-time of the low-side switch LS is more appropriately controlled or adjusted according to the detected negative current that flows from the output inductor L to the low-side switch LS within the on-time of the low-side switch LS. Therefore, the negative current that flows from the output inductor L to the low-side switch LS is prevented from being increased to the excessive value to cause damage to the low-side switch LS and other circuit components in the power converter.

Figure 6:
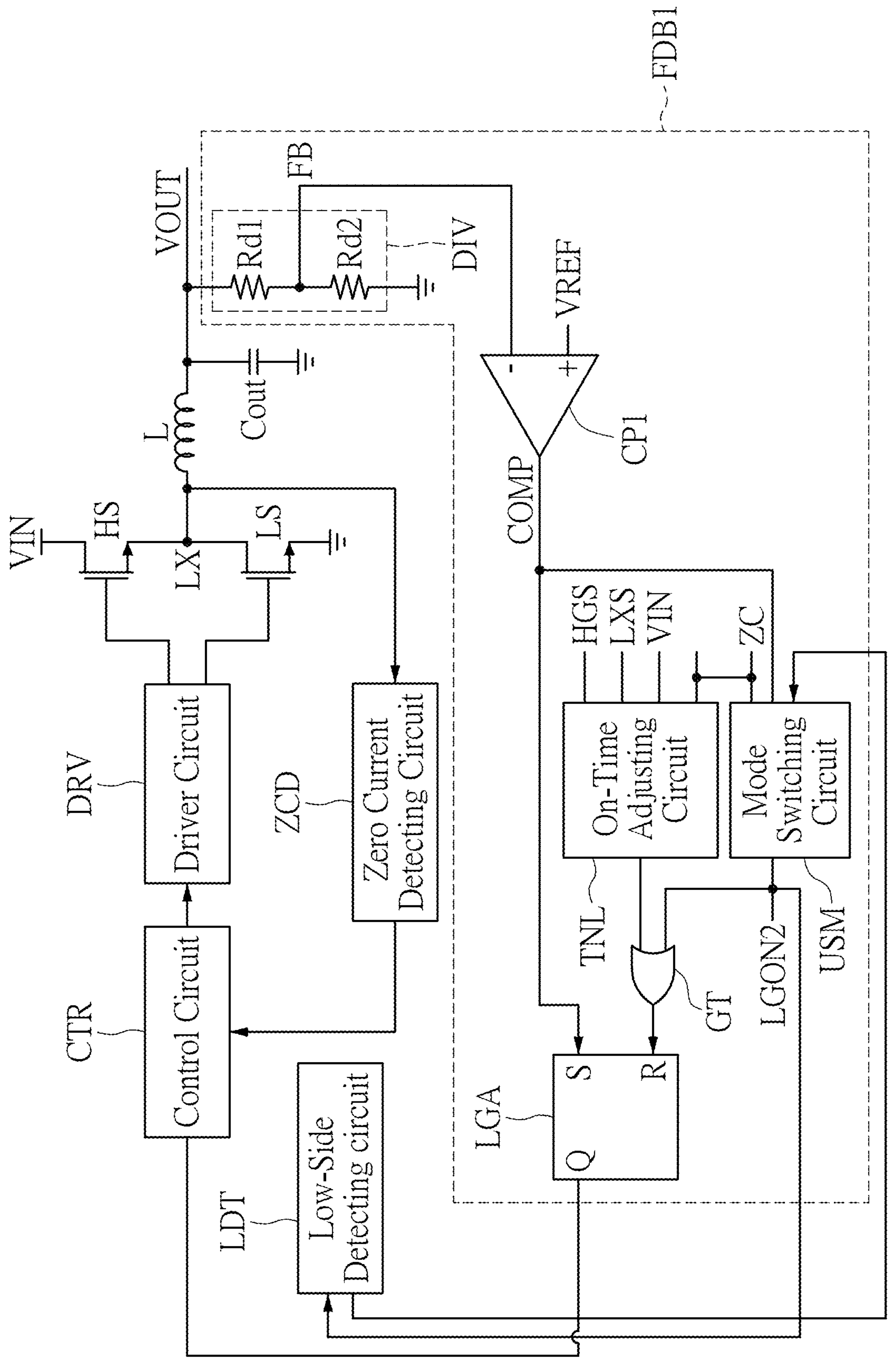
FIG. 6 is a circuit diagram of a power converter according to a sixth embodiment of the present disclosure.

Reference is made to FIG. 6, which is a circuit diagram of a power converter according to a sixth embodiment of the present disclosure.

The descriptions of the sixth embodiment of the present disclosure that are the same as the descriptions of the first to fifth embodiments of the present disclosure are not repeated herein. A difference between the sixth and fifth embodiments of the present disclosure is that, a feedback circuit FDB1 of the power converter of the sixth embodiment of the present disclosure includes a comparing circuit (including a comparator CP1), a mode switching circuit USM, a logic circuit LGA, an on-time adjusting circuit TNL and a logic gate GT, some of which may be omitted in practice.

A first input terminal such as an inverting input terminal of the comparator CP1 may be connected to the feedback node between the first terminal of the second dividing resistor Rd2 and the second terminal of the first dividing resistor Rd1 as shown in FIG. 6, or may be directly connected to the output node between the second terminal of the output inductor L and the first terminal of the output capacitor Cout in practice.

A second input terminal such as a non-inverting input terminal of the comparator CP1 may be coupled with a reference voltage VREF. The mode switching circuit USM may be connected to an output terminal of the comparator CP1 (and the zero current detecting circuit ZCD).

The on-time adjusting circuit TNL may be connected to the zero current detecting circuit ZCD, the control terminal of the high-side switch HS, and the first node LX between the first terminal of the low-side switch LS and the second terminal of the high-side switch HS. The on-time adjusting circuit TNL may be coupled with the input voltage VIN.

For example, the logic gate GT may include an OR gate shown in FIG. 6, or may include other types of logic gates in practice, but the present disclosure is not limited thereto. A first input terminal of the logic gate GT is connected to the on-time adjusting circuit TNL, and a second input terminal of the logic gate GT is connected to the mode switching circuit USM.

For example, the logic circuit LGA may include an SR flip-flop, but the present disclosure is not limited thereto. A first input terminal S of the SR flip-flop of the logic circuit LGA may be connected to the output terminal of the comparator CP1. A second input terminal R of the SR flip-flop of the logic circuit LGA may be connected to an output terminal of the logic gate GT.

In the sixth embodiment, the comparator CP1 compares the divided volage FB of the output voltage VOUT of the power converter with the reference voltage VREF to output a comparing signal COMP. The divided volage FB may be the voltage of the first terminal of the second dividing resistor Rd2. In practice, the comparator CP1 may directly compare the output voltage VOUT of the power converter with the reference voltage VREF to output the comparing signal COMP.

The mode switching circuit USM, according to the comparing signal COMP from the output terminal of the comparator CP1 (and a zero current detected signal ZC from the zero current detecting circuit ZCD), sets an operational mode of the power converter to output a mode switching signal LGON2. For example, the power converter may switch between a plurality of operational modes such as an ultrasonic mode (USM) and a pulse frequency modulation (PFM), but the present disclosure is not limited thereto.

The on-time adjusting circuit TNL detects a high-side on-time signal HGS that is outputted to the control terminal of the high-side switch HS from the driver circuit DRV, a voltage signal LXS of the first node LX between the first terminal of the low-side switch LS and the second terminal of the high-side switch HS, the input voltage VIN, the zero current detected signal ZC or any combination thereof to output an on-time control signal.

The logic circuit LGA outputs a logic gate signal according to a logic level of the on-time control signal from the on-time adjusting circuit TNL and a logic level of the mode switching signal LGON2 from the mode switching circuit USM.

The logic circuit LGA outputs the logic gate signal as the feedback signal according to the logic gate signal from the output terminal of the logic gate GT and the comparing signal COMP from the output terminal of the comparator CP1.

The control circuit CTR outputs the control signal according to the feedback signal from the logic circuit LGA. The driver circuit DRV, according to the control signal from the control circuit CTR, outputs the high-side on-time signal to the control terminal of the high-side switch HS and outputs the low-side on-time signal to the control terminal of the low-side switch LS.

Figure 7:
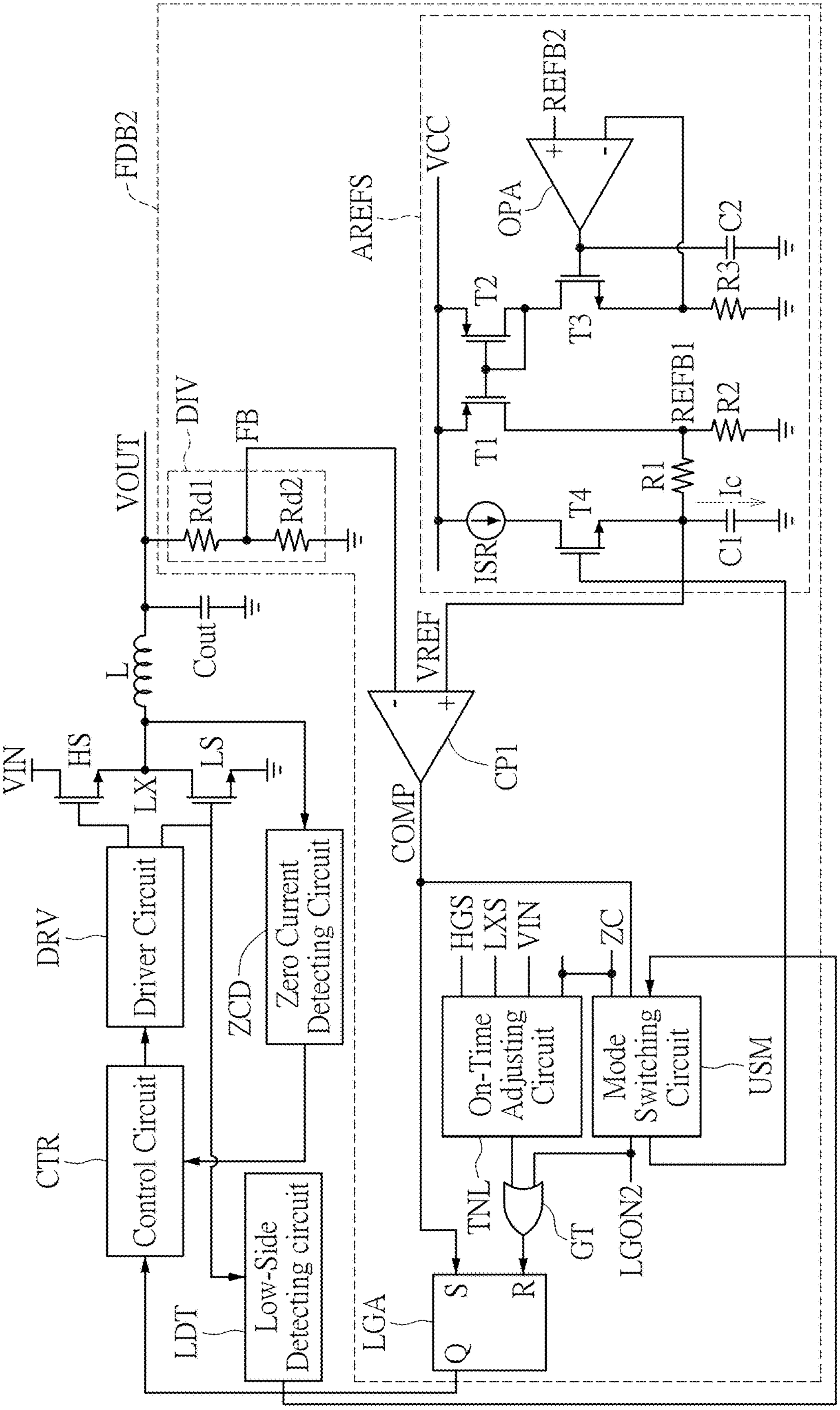
FIG. 7 is a circuit diagram of a power converter according to a seventh embodiment of the present disclosure.

It is worth noting that, the low-side detecting circuit LDT may detect the mode switching signal LGON2 outputted by the mode switching circuit USM included in the feedback circuit FDB1 as shown in FIG. 6, a voltage or a current at the second node between the first terminal of the low-side switch LS and the first terminal of the output inductor L as shown in FIG. 1 or FIG. 2, or a low-side on-time signal that is outputted to the control terminal of the low-side switch LS by the driver circuit DRV as shown in FIG. 3, FIG. 4 and FIG. 7 to output a low-side switching instruction signal.

The mode switching circuit USM adjusts the mode switching signal LGON2 according to the low-side switching instruction signal from the low-side detecting circuit LDT.

The control circuit CTR outputs the adjusted control signal according to the adjusted mode switching signal LGON2 from the mode switching circuit USM. The driver circuit DRV, according to the adjusted control signal from the control circuit CTR, outputs the adjusted high-side on-time signal HGS to the control terminal of the high-side switch HS and outputs the adjusted low-side on-time signal to the control terminal of the low-side switch LS. As a result, the on-time of the high-side switch HS and the on-time of the low-side switch LS are adjusted.

Therefore, the on-time of the low-side switch LS is appropriately modulated to prevent the negative current that flows from the output inductor L to the low-side switch LS from being increased to the excessive value to cause damage to the low-side switch LS and other circuit components in the power converter of the present disclosure.

Reference is made to FIG. 7, which is a circuit diagram of a power converter according to a seventh embodiment of the present disclosure.

The descriptions of the seventh embodiment of the present disclosure that are the same as the descriptions of the sixth embodiment of the present disclosure are not repeated herein.

A difference between the seventh and sixth embodiments of the present disclosure is that, the power converter of the seventh embodiment of the present disclosure further includes a reference voltage supplying circuit AREFS as shown in FIG. 7.

The second input terminal such as the non-inverting input terminal of the comparator CP1 may be connected to the reference voltage supplying circuit AREFS, and receives the reference voltage VREF from the reference voltage supplying circuit AREFS.

For example, as shown in FIG. 7, the reference voltage supplying circuit AREFS includes a first capacitor C1, a second capacitor C2, a reference current source ISR, a first resistor R1, a second resistor R2, a first transistor T1, a second transistor T2, a third resistor R3, a third transistor T3, an operational amplifier OPA and fourth transistor T4, some of which may be omitted in practice. For example, in practice, the reference voltage supplying circuit AREFS may only include the reference current source ISR, the first capacitor C1 and the first resistor R1.

As shown in FIG. 7, a first terminal of the fourth transistor T4 may be connected to the reference current source ISR, and a second terminal of the fourth transistor T4 may be connected to a first terminal of the first capacitor C1. A second terminal of the first capacitor C1 is grounded. A control terminal of the fourth transistor T4 is connected to the mode switching circuit USM.

A first terminal of the first resistor R1 may be connected to the first terminal of the first capacitor C1. A second terminal of the first resistor R1 may be connected to a first terminal of the second resistor R2. A second terminal of the second resistor R2 is grounded. A first reference node between the second terminal of the first resistor R1 and the first terminal of the second resistor R2 has a first reference voltage level REFB1.

A first terminal of the first transistor T1 and a first terminal of the second transistor T2 may be coupled with a common voltage VCC. A second terminal of the first transistor T1 may be connected to the first reference node between the second terminal of the first resistor R1 and the first terminal of the second resistor R2. A control terminal of the first transistor T1 may be connected to a control terminal and a second terminal of the second transistor T2.

A first terminal of the third transistor T3 may be connected to the second terminal of the second transistor T2. A second terminal of the third transistor T3 may be connected to a first terminal of the third resistor R3. A second terminal of the third resistor R3 is grounded.

A first terminal of the second capacitor C2 may be connected to a control terminal of the third transistor T3. A second terminal of the second capacitor C2 is grounded.

A first input terminal such as a non-inverting input terminal of the operational amplifier OPA may be coupled with a second reference voltage level REFB2. A second input terminal such as an inverting input terminal of the operational amplifier OPA may be connected to a node between the second terminal of the third transistor T3 and the first terminal of the third resistor R3. An output terminal of the operational amplifier OPA may be connected to the control terminal of the third transistor T3.

The operational amplifier OPA multiplies a difference between the second reference voltage level REFB2 and a voltage of the first terminal of the third resistor R3 by a gain to output an operational amplified signal to the control terminal of the third transistor T3 for controlling an operation of the third transistor T3.

The reference current source ISR supplies a reference current Ic to the first capacitor C1 through the fourth transistor T4 for charging the first capacitor C1 to have the reference voltage VREF. The reference voltage VREF is inputted to the second input terminal such as the non-inverting input terminal of the comparator CP1.

It is worth noting that, the mode switching circuit USM, according to the low-side switching instruction signal from the low-side detecting circuit LDT, controls the fourth transistor T4 such that the reference voltage VREF inputted to the second input terminal such as the non-inverting input terminal of the comparator CP1 is adjusted. As a result, the comparing signal COMP outputted by the comparator CP1 is adjusted. As a result, the on-time of the low-side switch LS is controlled to not exceed a time threshold, thereby preventing the negative current that flows from the output inductor L to the low-side switch LS from being increased to the excessive value to cause damage to the power converter.

Figure 8:
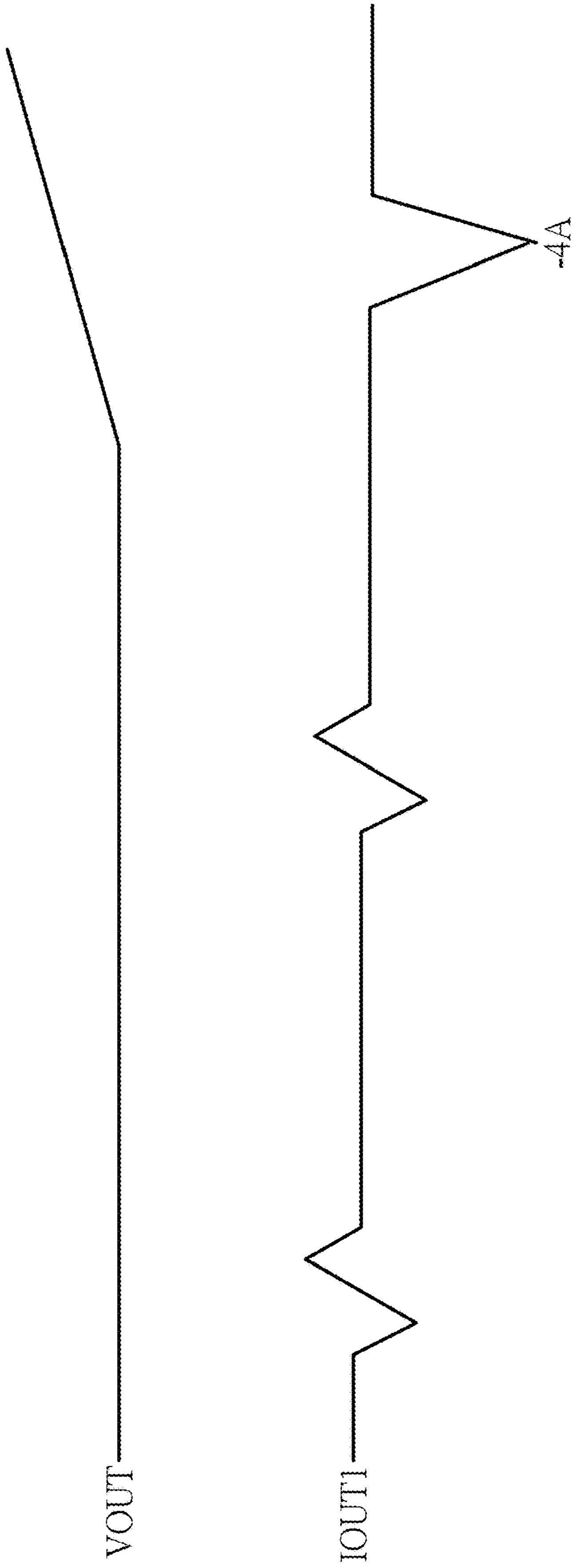
FIG. 8 is a waveform diagram of signals of the power converter according to the first to seventh embodiments of the present disclosure.
Figure 9:
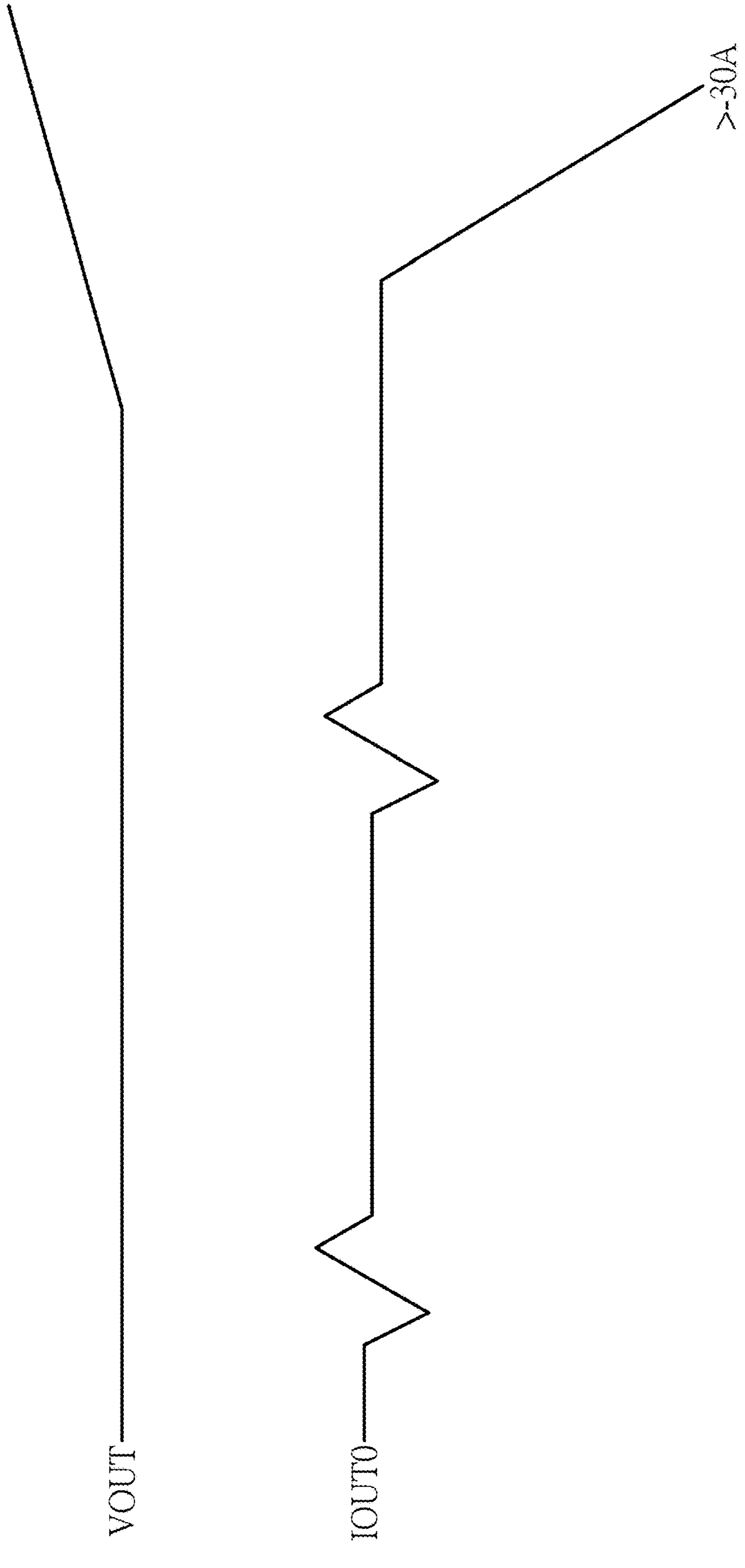
FIG. 9 RELATED ART
FIG. 9 is a waveform diagram of signals of a conventional power converter.

Reference is made to FIG. 8 and FIG. 9, in which FIG. 8 is a waveform diagram of signals of the power converter according to the first to seventh embodiments of the present disclosure, and FIG. 9 is a waveform diagram of signals of a conventional power converter.

As shown in FIG. 9, when the output voltage VOUT of the conventional power converter is gradually increased to exceed a voltage required for a load (such as a super light load), a low-side switch of the conventional power converter is turned on for a long period of time within which the conventional power converter outputs a negative output current IOUO shown in FIG. 9. The negative output current IOUO of the conventional power converter drops to too low a current value, such as −30A shown in FIG. 9 or or less, which results in damage to the conventional power converter.

In contrast, as shown in FIG. 5, when the output voltage VOUT of the power converter of the present disclosure (such as the power converter shown in FIG. 1 to FIG. 7) is gradually increased to exceed the voltage required for the load (such as the super light load), the low-side switch LS of the power converter of the present disclosure is turned on. At this time, the power converter of the present disclosure outputs a negative output current IOUT1 shown in FIG. 8.

The on-time of the low-side switch LS of the power converter of the present disclosure is effectively limited to not exceed the time threshold such that the negative output current IOUT1 is not continually reduced to be smaller than a lower limit current value such as −0.4A shown in FIG. 8, thereby preventing the low-side switch LS and other circuit components of the power converter of the present disclosure from being damaged.

In conclusion, the present disclosure provides the power converter of limiting the negative current. When the load transits from a heavy load or a medium load to the (super) light load or the input voltage is abnormally increased, the high-side switch is turned off and the low-side switch is turned on in the power converter of the present disclosure. At the same time, in the power converter of the present disclosure, the low-side detecting circuit detects the negative current flowing through the low-side switch or the low-side on-time signal of the low-side switch. The on-time of the low-side switch is limited according to the detected negative current or the detected low-side on-time signal such that the negative current flowing through the low-side switch is limited to being within a safe operation range that the low-side switch and other circuit components of the power converter are capable of withstanding. Therefore, the negative current flowing through the low-side switch of the power converter of the present disclosure is effectively prevented from being increased to an excessive value to cause damage in the low-side switch of the power converter of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter of limiting a negative current, comprising:

a high-side switch, wherein a first terminal of the high-side switch is coupled with an input voltage;

a low-side switch, wherein a first terminal of the low-side switch is connected to a second terminal of the high-side switch, a second terminal of the low-side switch is grounded, a first node between the first terminal of the low-side switch and the second terminal of the high-side switch is connected to a first terminal of an output inductor, a second terminal of the output inductor is connected to a first terminal of an output capacitor, and a second terminal of the output capacitor is grounded;

a voltage divider circuit connected to an output node between the second terminal of the output inductor and the first terminal of the output capacitor, and configured to divide an output voltage of the output node to generate a divide voltage;

a comparing circuit connected to the voltage divider and configured to compare the divided volage with a reference voltage to output a comparing signal;

a mode switching circuit connected to the comparing circuit, and configured to output a mode switching signal according to the comparing signal;

a low-side detecting circuit configured to detect the mode switching signal, a voltage of a second node between the first terminal of the low-side switch and the first terminal of the output inductor, a current flowing through the second node, or a low-side on-time signal to output a low-side switching instruction signal, wherein the mode switching circuit is configured to adjust the mode switching signal according to the low-side switching instruction signal;

a control circuit connected to the low-side mode switching circuit and configured to output a control signal according to the mode switching signal; and a driver circuit connected to the control circuit, a control terminal of the high-side switch and a control terminal of the low-side switch, and configured to output a high-side on-time signal to the control terminal of the high-side switch and output the low-side on-time signal to the control terminal of the low-side switch according to the control signal.

2. The power converter according to claim 1, wherein the feedback circuit further includes:

a logic circuit connected to the comparing circuit, the mode switching circuit and the low-side detecting circuit, and configured to output a logic signal according to the comparing signal and the mode switching signal;

wherein the control circuit outputs the control signal according to the logic signal.

3. The power converter according to claim 2, further comprising:

an on-time adjusting circuit connected to the logic circuit, and configured to detect the high-side on-time signal, a voltage signal of the first node, the input voltage or any combination thereof to output an on-time control signal;

wherein the logic circuit outputs the logic signal according to the on-time control signal, the comparing signal and the mode switching signal.

4. The power converter according to claim 3, further comprising:

a logic gate, wherein a first input terminal of the logic gate is connected to the mode switching circuit and receives the mode switching signal from the mode switching circuit, a second input terminal of the logic gate is connected to the on-time adjusting circuit and receives the on-time control signal from the on-time adjusting circuit, and an output terminal of the logic gate is connected to an input terminal of the logic circuit;

wherein the logic circuit outputs the logic signal according to a logic gate signal and the comparing signal.

5. The power converter according to claim 1, further comprising:

a zero current detecting circuit connected to the first node and the control circuit, and configured to detect a current signal flowing through the first node and determine whether the current signal reaches a zero value to output a zero current detected signal;

wherein the control circuit modulates the control signal according to the zero current detected signal.

6. The power converter according to claim 1, further comprising:

a reference voltage generating circuit including:

a reference current source configured to supply a reference current;

a first capacitor, wherein a first terminal of the first capacitor is connected to the reference current source, and a second terminal of the first capacitor is grounded; and a first resistor, wherein a first terminal of the first resistor is connected to the first terminal of the first capacitor, and a second terminal of the first resistor is coupled with a first reference voltage level;

wherein the comparing circuit compares the output voltage with a voltage of the first terminal of the first capacitor to output the comparing signal.

7. The power converter according to claim 6, wherein the reference voltage generating circuit further includes:

a second resistor, wherein a first terminal of the second resistor is connected to the second terminal of the first resistor, and a second terminal of the second resistor is grounded.

8. The power converter according to claim 7, wherein the reference voltage generating circuit further includes:

a first transistor, wherein a first terminal of the first transistor is coupled with a common voltage, and a second terminal of the first transistor is connected to the second terminal of the first resistor; and a second transistor, wherein a first terminal of the second transistor is coupled with the common voltage, a control terminal of the second transistor is connected to a control terminal of the first transistor and a second terminal of the second transistor, and a second terminal of the second transistor is grounded.

9. The power converter according to claim 8, wherein the reference voltage generating circuit further includes:

a third transistor, wherein a first terminal of the third transistor is connected to the first terminal of the second transistor;

an operational amplifier, wherein a first input terminal of the operational amplifier is coupled with a second reference voltage level, a second input terminal of the operational amplifier is connected to a second terminal of the third transistor, and an output terminal of the operational amplifier is connected to a control terminal of the third transistor; and a third resistor, wherein a first input terminal of the third resistor is connected to the second terminal of the third transistor, and a second terminal of the third resistor is grounded.

10. The power converter according to claim 9, wherein the reference voltage generating circuit further includes:

a second capacitor, wherein a first terminal of the second capacitor is connected to the control terminal of the third transistor, and a second terminal of the second capacitor is grounded.

11. The power converter according to claim 9, wherein the reference voltage generating circuit further includes:

a fourth transistor, wherein a first terminal of the fourth transistor is connected to the reference current source, and a second terminal of the fourth transistor is connected to the first terminal of the first capacitor.

* * * * *